United States Patent

Woo

Patent Number: 5,210,661
Date of Patent: May 11, 1993

[54] METHOD OF SKIPPING UNRECORDED AREAS WHILE PLAYING BACK A RECORD MEDIUM ON A DRIVE

[75] Inventor: Jong-Sam Woo, Seoul, Rep. of Korea

[73] Assignee: Samsung Electronics Co., Ltd., Kyungki, Rep. of Korea

[21] Appl. No.: 579,596

[22] Filed: Sep. 7, 1990

[30] Foreign Application Priority Data

Sep. 8, 1989 [KR] Rep. of Korea ............... 1989-13039

[51] Int. Cl.⁵ .................................................. G11B 15/18
[52] U.S. Cl. ...................................... 360/71; 360/72.1
[58] Field of Search ............... 360/71, 73.06, 72.2, 360/72.1

[56] References Cited

U.S. PATENT DOCUMENTS

| | | | |
|---|---|---|---|
| Re. 33,765 | 12/1991 | Takahashi et al. | 360/72.1 |
| 3,586,789 | 6/1971 | Butcher et al. | 360/73.06 |
| 4,404,604 | 9/1983 | Ueki et al. | 360/71 |
| 4,532,561 | 7/1985 | Kimura et al. | 360/73.06 |
| 4,551,774 | 11/1985 | Sakaguchi et al. | 360/72.1 |
| 4,649,442 | 3/1987 | Kunii et al. | 360/72.2 |
| 4,811,131 | 3/1989 | Sander et al. | 360/72.1 |

Primary Examiner—Joseph L. Dixon
Assistant Examiner—David L. Robertson
Attorney, Agent, or Firm—Robert E. Bushnell

[57] ABSTRACT

There is disclosed a method of skipping unrecorded area during playback in order to minimize an interruption time upon playing back a recorded program in a tape drive. The method is performed while playing back a record medium, such that an area with no videos and audios is played back at a high speed and an area with videos and audios is played back at a normal speed, resulting in minimized time for playing back unrecorded areas, thus yielding another advantage in that an audience is kept from being bored and, furthermore, power is saved by automatically turning the power-off when the record medium playback is completed.

9 Claims, 4 Drawing Sheets

METHOD OF SKIPPING UNRECORDED AREAS WHILE PLAYING BACK A RECORD MEDIUM ON A DRIVE

BACKGROUND OF THE INVENTION

The present invention relates to a method of operating a record medium drive, and more particularly to a method of playing back only recorded areas while skipping unrecorded areas of a record medium when in playback mode.

In general, there are many types of record medium drives, such as VTR (Video Tape Recorder), R-DAT (Digital Audio Tape Recorder) and ordinary audio tape recorders for which tape is the record medium, and CDP (Compact Disk Player) and CDVP (Compact Disk Video Player) for which disks are the record media. All the record medium drives operate based on the same operational principles; however, of the record medium drives, VTR shall be taken as an example for describing how a record medium is driven during playback. In cases where a tape has a recorded program, a waiting status with no videos and audios recorded thereon continues for a certain length of time at the beginning and ending portions of the tape during playback because neither a video nor an audio is recorded at the beginning and ending portions.

There has been a drawback therefore that the audience may become bored while the waiting status is continuing for a certain length of time on playback. Another drawback is that the audience will most likely come to conclude that one program has ended or the tape playback has been completed, so the audience stops playing back the tape without further viewing any remainder of the entire recorded program when there exists an unrecorded area in the middle of the tape.

SUMMARY OF THE INVENTION

It is therefore an object of the present invention to provide a method of skipping an unrecorded area during playback in order to minimize interruption time upon playing back a recorded program in a tape drive.

DETAILED DESCRIPTION OF THE PREFERRED EMBODIMENT

The present invention will be now described more specifically with reference to the drawings attached by way of example only.

Figure 1A:
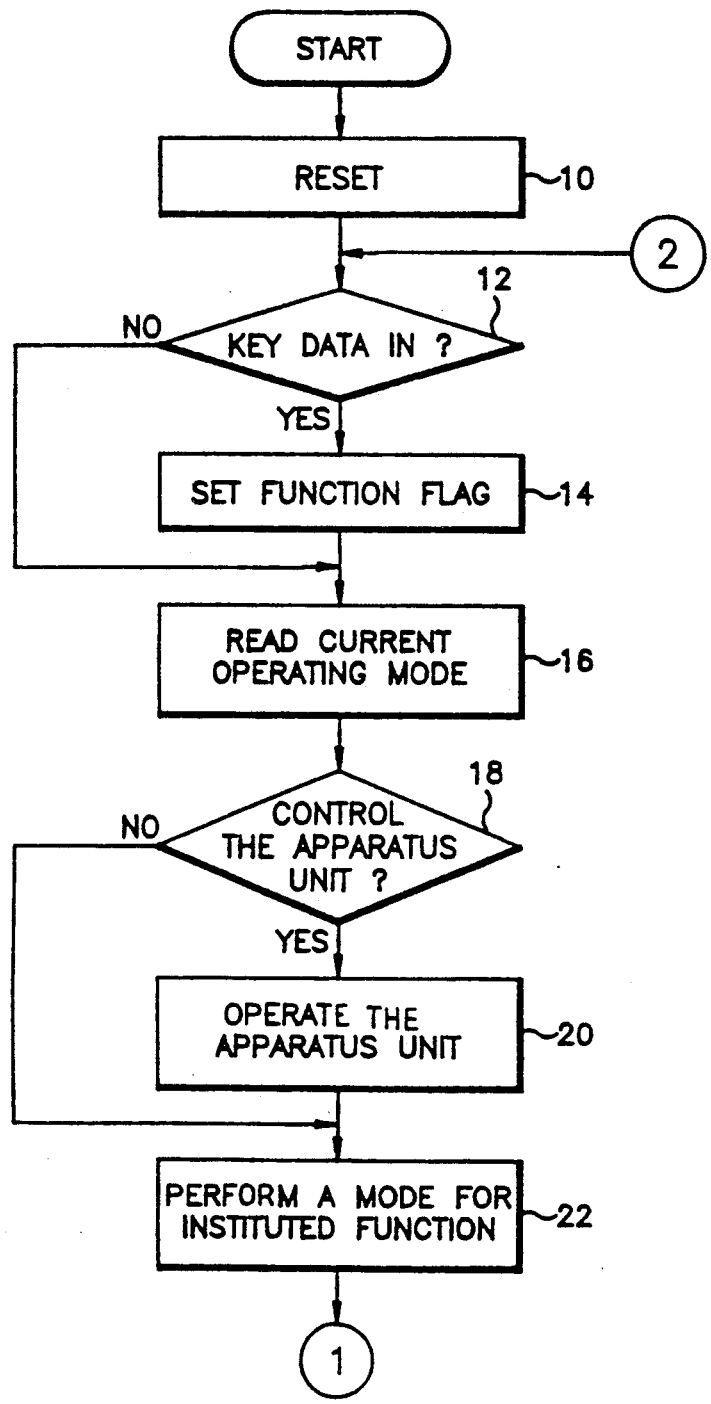
FIGS. 1A and 1B are flow charts of a preferred embodiment according to the present invention.
Figure 1B:
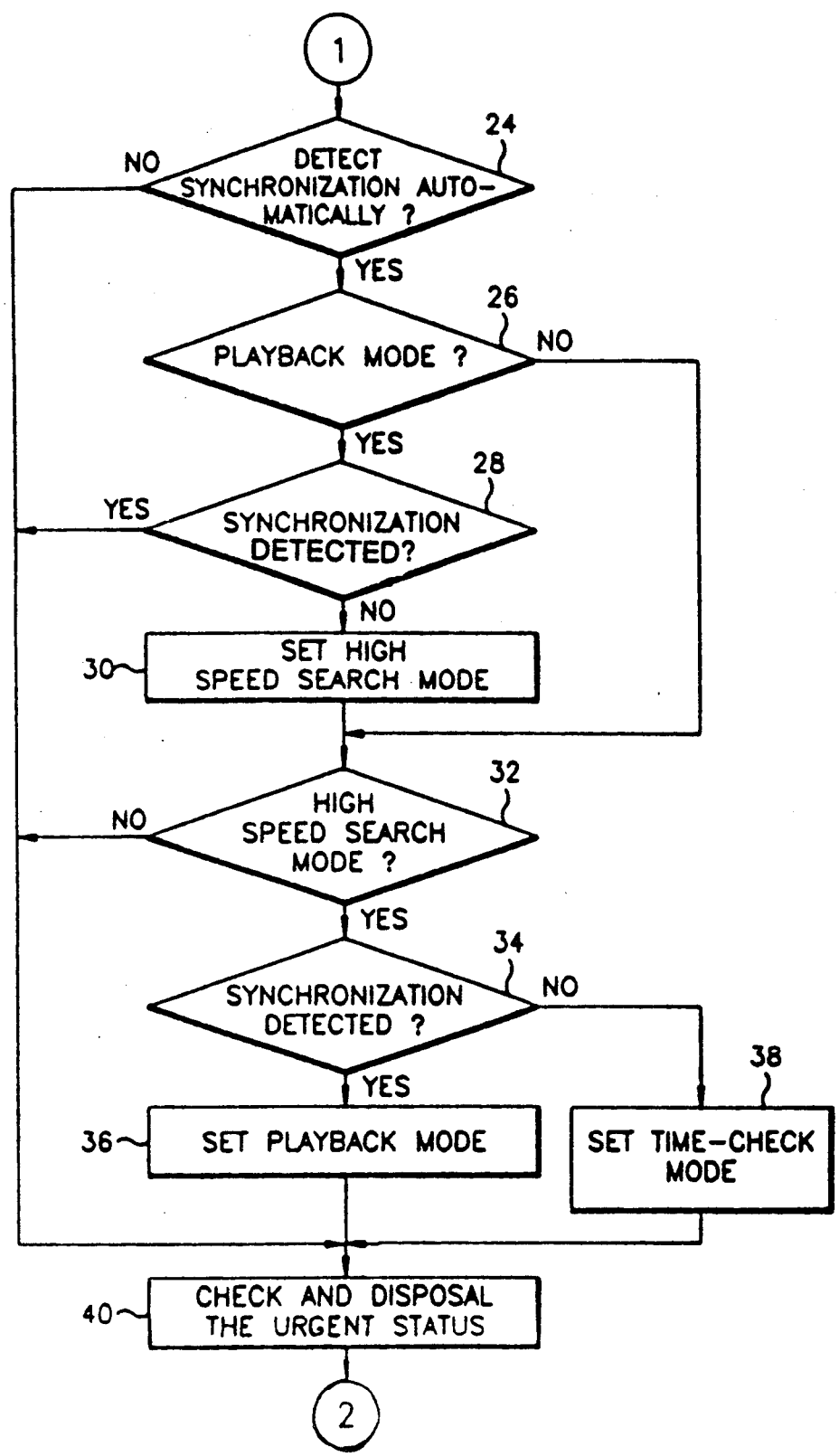
Figure 2:
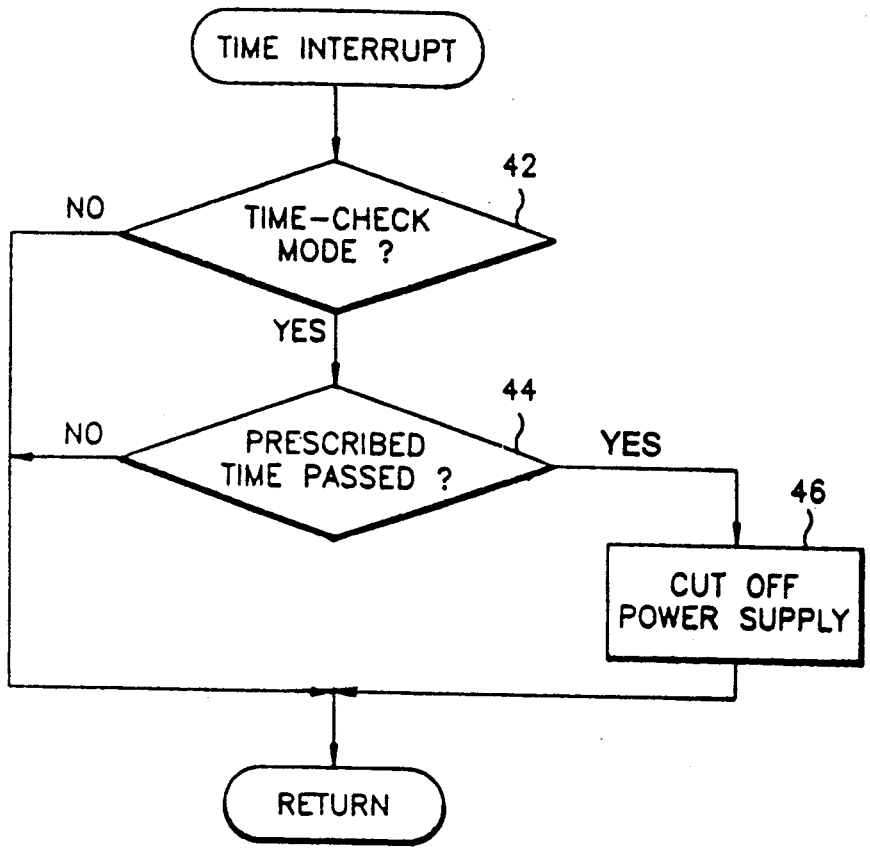
FIG. 2 is a flow chart operating time interrupt in the method according to the present invention.

Referring to FIGS. 1A, 1B and 2 illustrating flow charts of the preferred embodiment of the present invention, first it checks whether or not a record medium drive is in a mode of automatically detecting a synchronization signal. Thereafter, a normal playback operation from the record medium is carried out until no synchronization signal is detected, when the drive is in the mode of automatically detecting a synchronization signal. Then, a high speed playback operation of the record medium is performed to check presence of video and audio signals, when no synchronization signal is detected further. Otherwise, it is returned to an initial control sequence when the synchronization signal is detected. A power supply is controlled to stop the playback operation if no synchronization signal is detected over a certain length of time.

Figure 3:
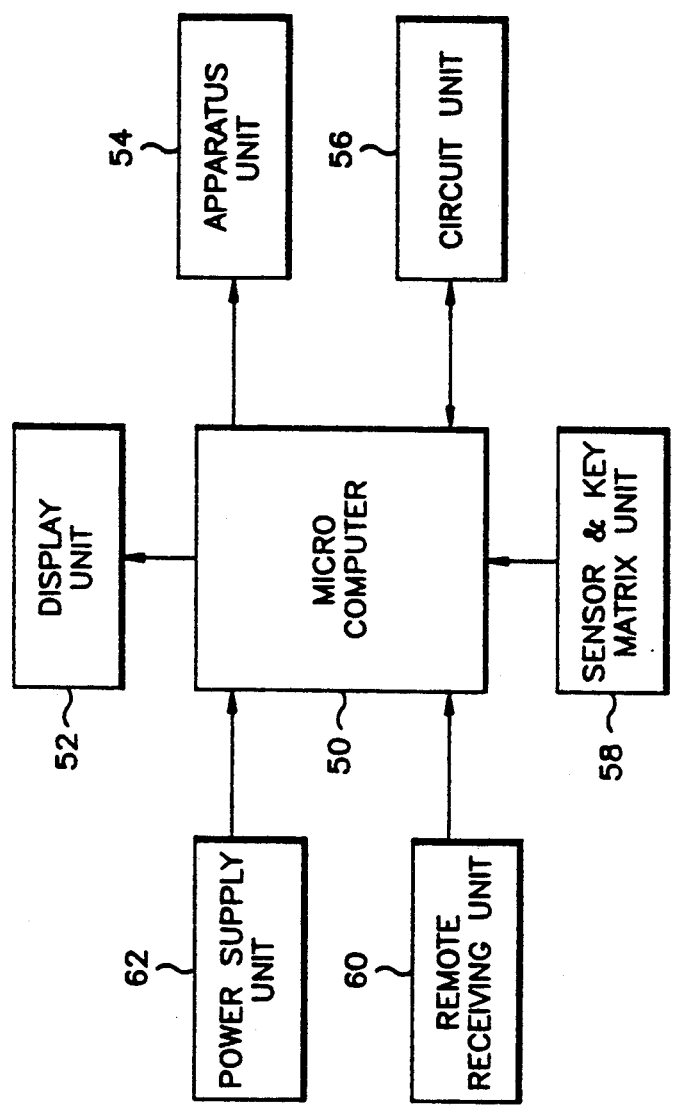
FIG. 3 is a block diagram of the device for execution of the method according to the present invention.

FIG. 3 shows a block diagram of part of a conventional record medium drive apparatus, for example, a video tape recorder, incorporating the preferred embodiment method of FIGS. 1A, 1B and 2 in accordance with the present invention. A microcomputer 50 controls the entire operation according to the preferred embodiment system. A display unit 52 indicates all of the operating status of the system under control of the microcomputer 50. An apparatus unit 54 drives the record medium under control of the microcomputer 50. A circuit unit 56 records and plays back audio and video signals on the record medium, detects and feeds the synchronization signals to the microcomputer 50, under control of the microcomputer 50. A sensor and key matrix unit 58 detects and supplies the operating status of the system and the key data specified by an operator to the microcomputer 50. A remote receiving unit 60 receives and converts remote control signals into the key data, which then is sent to the microcomputer 50. A power supply unit 62 supplies operating power to each unit of the system.

The preferred embodiment of the present invention is essentially performed with the microcomputer 50, wherein no detailed description of operation thereto shall be given with reference to FIG. 3 which shows a block diagram of part of a conventional record medium drive apparatus, for example, a video tape recorder, incorporating the preferred embodiment method of FIGS. 1A, 1B and 2 in accordance with the present invention.

Referring to FIGS. 1A and 1B, in a step 10, the microcomputer 50 controls and initializes each unit of the system, including the display unit 52, apparatus unit 54 and circuit unit 56 when the system is powered on. In a step 12, the microcomputer 50 checks whether or not there was a key data input from the sensor and key matrix unit 58 or the remote receiving unit 60 after having performed the step 10. In a step 14, the microcomputer 50 sets a relevant function flag among its own flags to specify performing of a function according to the key data when there was a key data input in the step 12. In a step 16, the microcomputer 50 reads a current operating mode by getting the sensed status signal from the sensor and key matrix unit 58 when there was no key data input in the step 12 or after performing the step 14. In a step 18, the microcomputer 50 determines whether or not the apparatus unit 54 must be controlled by comparing whether or not the current operating mode is the same as an operating mode of a flag which was specified to perform a function, among the flags of the microcomputer 50, after performing the step 16. In a step 20, the microcomputer 50 operates the apparatus unit 54 according to the relevant operating mode specified by the key data (that is, the flag that has been set), when the apparatus unit 54 must be controlled in the step 18. In a step 22, the microcomputer 50 controls the circuit unit 56 to operate according to the relevant mode specified by the key data (that is, the flag that has been set), after the microcomputer 50 performs the step 20 or when the apparatus unit 54 needs not be controlled in step 18. In a step 24, the microcomputer 50 checks whether or not the sychronization signal must be automatically detected to determine if a current operating area of a record medium being played back is the area with either a video or an audio recorded, by checking set status of the flags in the microcomputer 50 after performing the step 22. In a step 26, the microcomputer 50 determines whether or not the current operating mode is playback mode, by checking the set status of the operating mode flags, when the synchronization signal must be automatically detected in the step 24. In a step 28, the microcomputer 50 checks whether or not the synchronization signal is existent by checking the logic status of the synchronization detection signal after receiving a synchronization detection signal, when the current operating mode is playback mode in the step 26. In a step 30, the microcomputer 50 sets a high speed search mode by setting a high speed search mode flag from the flags in the microcomputer 50, when there was no the synchronization signal in the step 28. In a step 32, the microcomputer 50 determines whether or not the current operating mode is the high speed search mode by checking set status of the flags in the microcomputer 50, after the microcomputer 50 has performed the step 30 or when the current mode is not playback mode in the step 26. In a step 34, the microcomputer 50 checks whether or not the synchronization signal is existent, by checking the logic status of the synchronization detection signal after receiving the synchronization detection signal from the circuit unit 56, when the current operating mode is high speed search mode signal in the step 32. In a step 36, the microcomputer 50 specifies the playback mode by setting the playback mode flag instead of the high speed search mode flag, when the synchronization signal is detected in the step 34. In a step 38, the microcomputer 50 sets the time-check mode by setting a time-check mode flag, and operates a built-in timer of the microcomputer 50, when the synchronization signal is undetected in the step 34. In a step 40, the microcomputer 50 receives sensing signals for the operating status of each part of the system from the sensor and key matrix unit 58, and checks the sensing signals, and if an abnormal operating status is present, the microcomputer controls and recovers the apparatus unit 54 to a normal operating status in an urgent manner and then returns to the step 12, as well as when the automatic detection of synchronization signal need not be performed in the step 24, when the synchronization signal is detected in the step 28, when the current operating mode in the step 32 is not the high speed search mode, or after performing the steps 36 or 38.

Referring to FIG. 2, a flow chart for a time interrupt which is performed by the microcomputer 50 whenever interrupts occur at a certain time interval, in a step 42, the microcomputer 50 determines whether or not the current operating mode is time-check mode, by checking whether or not a built-in time-check mode flag is set whenever an interrupt occurs. In a step 44, the microcomputer 50 determines whether or not a prescribed time has passed by checking whether or not a built-in timer has stopped, when the current operating mode is the time-check mode in the step 42. In a step 46, the microcomputer 50 cuts off the power supply which flows to each part of the system by controlling the power supply unit 62, when the prescribed time has passed in the step 44. The microcomputer 50 returns to the initial control sequence when the current operating mode is not time-check mode in the step 42, the prescribed time has not passed yet in the step 44, or after power is cut off in the step 46.

To summarize the flow chart of present invention, when there are videos or audios, whether pre-recorded or post-recorded, an area with no videos and audios is played back at a high speed and an area with videos or audios is played back at a normal speed of the record medium, by checking occurrences of synchronization signals which are detected from a record medium being played back, in addition, power is cut off if videos and audios are not detected over a certain length of time during high speed playback.

As described above, the present invention has an advantage that while playing back a record medium, an area with no videos and audios is played back at a high speed and an area with videos and audios is played back at a normal speed, to result in minimized time for playing back un-recorded areas, and the advantage yields another advantage in that the audience is kept from being bored and there is still another advantage in that power is saved by an automatic shut-off when the record medium playback is completed.

Although specific constructions and procedures of the invention have been illustrated and described herein, it is not intended that the invention be limited to the elements and constructions disclosed. One skilled in the art will easily recognize that the particular elements or subconstructions may be used without departing from the scope and spirit of the invention.

What is claimed is:

1. A method of skipping unrecorded areas while playing back a record medium by operating a record medium drive, said method comprising the steps of:
    (a) checking whether an automatic detection mode for a synchronization signal is on;
    (b) playing back normally the record medium until no synchronization signal is detected when said automatic detection mode for synchronization signal is on;
    (c) playing back the record medium at a high speed while checking for the presence of video and audio signals by checking for the detection of a synchronization signal if no synchronization signal is detected in said step (b), and going back to said step (a) if a synchronization is detected; and
    (d) cutting off power supply to stop playback operation if no synchronization signal is detected over a certain length of time in said step (c).

2. A process for controlling a record medium driver, comprising:
    checking for key data input;
    setting a function flag to specify an operating mode corresponding to said key data input;
    reading a current operating mode;
    comparing the current operating mode with the operating mode of the function flag, thereby determining whether the means for driving the record medium driver must be controlled;
    driving the record medium according to the operating mode specified by the function flag;
    recording or playing back audio and video signals on the record medium if the operating mode specified by the function flag indicates a recording mode or playback mode, respectively;
    determining whether a synchronization signal must be automatically detected;
    checking the status of the function flag, to determine whether the current operating mode is the playback mode if there has been a determination that said synchronization signal must be automatically detected;

checking whether the synchronization signal exists if the current operating mode is the playback mode; and setting a high speed search mode if no synchronization signal exists.

3. The process for controlling a record medium driver of claim 2, further comprising:

determining whether the current operating mode is a high speed search mode;

checking whether the synchronization signal exists if the current operating mode is the high speed search mode;

setting the playback mode if the synchronization signal has been detected;

setting a time-check mode if no synchronization signal has been detected;

determining whether an abnormal operating status is present, and returning the record medium driver to a normal operating status; and returning to an initial control sequence.

4. The process for controlling a record medium driver of claim 3, further comprising:

determining whether the current operating mode is the time-check mode;

determining whether a prescribed time has passed, if the current operating mode is the time-check mode;

cutting off a power supply, if the prescribed time has passed;

returning to the initial control sequence if the current operating mode is not the time-check mode;

returning to the initial control sequence if the prescribed time has not passed;

returning to the initial control sequence after the power supply is cut off.

5. A record medium driver controller, comprising:

a microcomputer;

means for driving a record medium;

means for recording audio, video and synchronization signals on the record medium;

means for playing back audio, video and synchronization signals from the record medium;

means for detecting synchronization signals on the record medium;

means for feeding said detected synchronization signals to the microcomputer;

a sensor and key matrix unit, disposed to detect the operating status of the system and to input any key data specified by an operator; wherein said microcomputer;

checks for key data input from the sensor and key matrix unit;

sets one of a plurality of function flags to specify an operating mode corresponding to said key data input;

reads a current operating mode from the sensor and key matrix unit;

determines whether the means for driving a record medium must be controlled by comparing the current operating mode with the operating mode specified by the function flag;

operates the means for driving a record medium according to the specified operating mode;

controls the means for recording and playing back audio and video signals according to the specified operating mode;

checks whether a synchronization signal must be automatically detected to determine if an operating area of a record medium currently being played back is an area containing video or audio signals;

determines whether the current operating mode is a playback mode by checking the set status of the function flag;

checks whether the synchronization signal exists in the current operating area if the current operating mode is the playback mode; and initiates a high speed search mode if no synchronization signal exists.

6. The record medium driver controller of claim 5, wherein said microcomputer;

determines whether the current operating mode is the high speed search mode;

checks whether the synchronization signal exists in the current operating area of the current operating mode is the high speed search mode;

sets the playback mode if the synchronization signal has been detected; and sets a time-check mode if no synchronization signal has been detected;

7. The record medium driver controller of claim 6, wherein said microcomputer:

receives sensing signals from the sensor and key matrix unit and determines whether the current operating mode is one other than the playback mode on the basis of the sensing signals received;

returns the means for driving the record medium to a normal operating status; and returns to an initial control sequence.

8. The record medium driver controller of claim 6, wherein said microcomputer:

determines whether the current operating mode is the time-check mode;

determines whether a prescribed time has passed if the current operating mode is the time-check mode;

cuts off a power supply if the prescribed time has passed;

returns to an initial control sequence if the current operating mode is not the time-check mode; returns to the initial control sequence if the prescribed time has not passed; and returns to the initial control sequence after the power supply is cut off.

9. The record medium driver controller of claim 5, further comprising means for receiving and converting remote control signals into the key data specified by an operator.

* * * * *

UNITED STATES PATENT AND TRADEMARK OFFICE
CERTIFICATE OF CORRECTION

PATENT NO. : 5,210,661
DATED : May 11, 1993
INVENTOR(S) : Jong-Sam Woo

It is certified that error appears in the above-indentified patent and that said Letters Patent is hereby corrected as shown below:

Column 2, line 12, change "status" to --status' --;
        line 67, chnage "sychronization" to --synchronization --;
Column 3, line 17, delete "the" (first occurrence);

Column 6, line 22, change "microcomputer," to --microcomputer: --;
        line 26, change "operation area of" to --operating area if --;
        line 52, after "the time-check mode;" make a new paragraph;

Signed and Sealed this

Sixth Day of September, 1994

Attest:

BRUCE LEHMAN

*Attesting Officer*     *Commissioner of Patents and Trademarks*